Patented Dec. 1, 1953

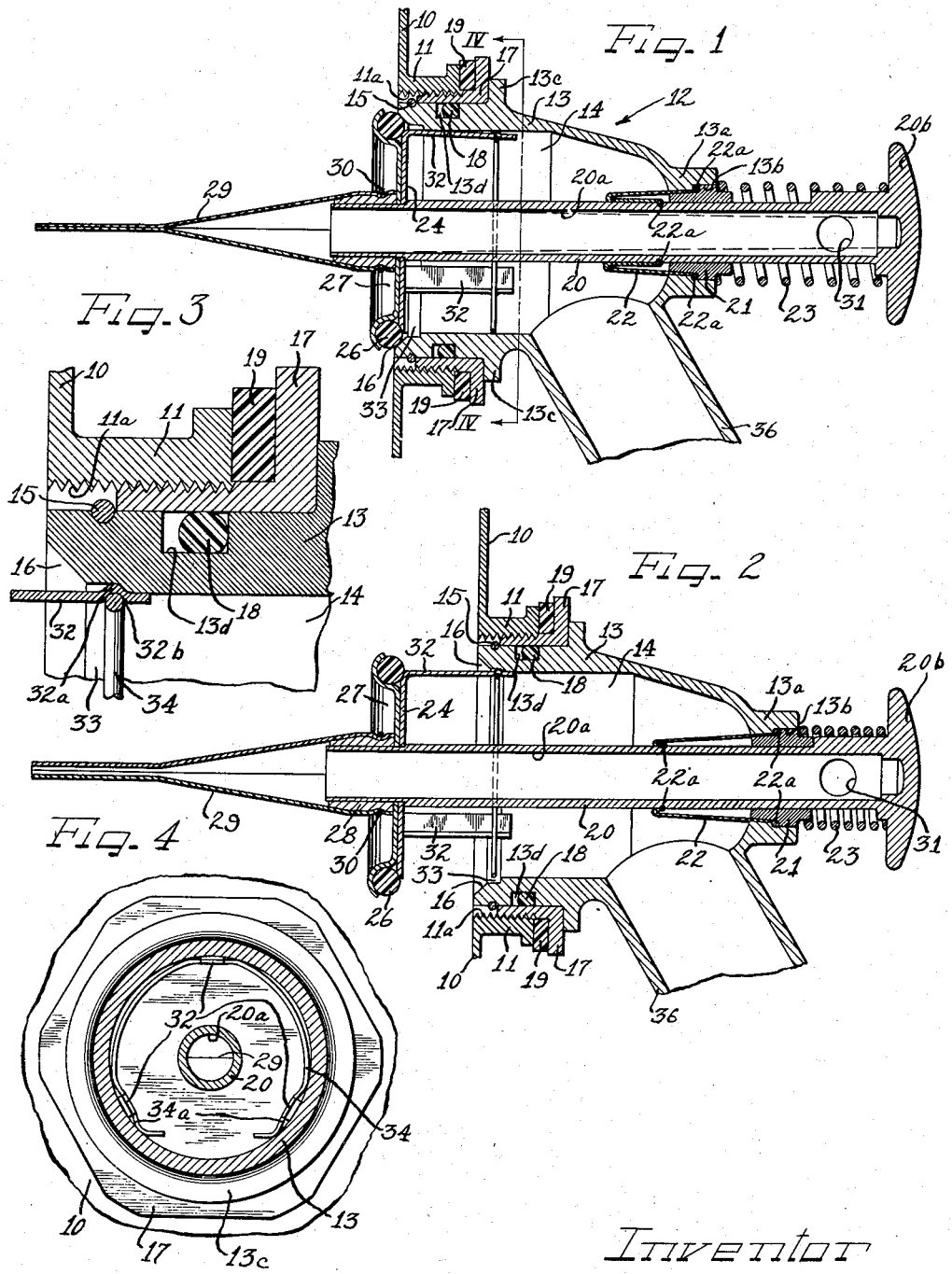

2,661,018

UNITED STATES PATENT OFFICE 2,661,018

DRUM VALVE ASSEMBLY

Jacob Rush Snyder, Cleveland, Ohio, assignor to Thompson Products, Inc., Cleveland, Ohio, a corporation of Ohio Application April 18, 1950, Serial No. 156,547

6 Claims. (Cl. 137—588)

This invention relates generally to fluid decanting apparatus and more particularly to a novel valve assembly including a reciprocable actuator selectively positioned in relatively fixed open and closed positions.

According to the general features of the present invention, a spigot structure adapted to be inserted into the drain opening of a drum-type closure includes a valve body defining a fluid passageway with an open end shaped to define a valve seat and having the other end thereof closed by a reduced neck portion. A rod-like actuator extends through the reduced neck portion and is supported thereby for reciprocation along the axis of the fluid passageway. A valve is carried on the end of the actuator and may be selectively seated in the valve opening to control the flow of fluid through the fluid passageway.

A particular feature of the present invention lies in the provision of a support element which not only forms a part of the valve structure but, in addition, defines a plurality of axially extended arms or guide fingers slidably cooperable with the walls of the fluid passageway to radially align the actuator and the valve. Moreover, the plurality of arms or guide fingers are each provided with beads which, together with a counterbore or step defined by the walls of the fluid passageway, form interlocking mating means to retain the valve assembly in a predetermined axial flow position.

The spigot structure of the present invention is further characterized by the provision of a sleeve-like diaphragm seal connected between the reduced neck portion of the valve body and the actuator. Reciprocation of the actuator results in the unrolling or rolling up of the diaphragm seal. However, the diaphragm seal is at all times fully operative to preclude leakage of the fluid outwardly from the fluid passageway to the outside of the spigot structure. The diaphragm seal is particularly efficient in its application to the structure of the present invention because break-away load need not be overcome as is frequently necessary when reciprocable actuating members are sealed with a structure constructed according to conventional practice.

It is an object of the present invention, therefore, to provide a drum valve assembly which may be positioned in selected axial flow and nonflow positions.

It is a further object of the present invention to provide a drum valve assembly made of simplified elements which are economical to produce and which include positioning means to radially align a reciprocable valve assembly relative to a valve seat and to lock the valve assembly in selected longitudinal positions.

Another object of the present invention is to provide an improved diaphragm seal structure for a joint between relatively movable elements of a drum valve assembly.

Many other features, advantages and additional objects of the present invention will become manifest to those versed in the art upon making reference to the following detailed description and the accompanying sheets of drawings in which—

Figure 1 is a longitudinal cross-sectional view of a drum valve assembly according to the present invention;

Figure 2 is a cross-sectional view similar to that shown in Figure 1, but with elements of the valve assembly relatively positioned to permit drainage of fluid;

Figure 3 is an enlarged fragmentary cross-sectional view showing additional details of construction of the valve assembly according to the present invention; and Figure 4 is a cross-sectional view taken on line IV—IV of Figure 1.

As shown on the drawings:

The drum or container 10 is provided having the usual drum opening which, in the present instance, may be characterized by the provision of an apertured boss 11 defining an internally threaded bore as at 11a.

The spigot structure of the present invention is indicated generally by the reference numeral 12 and includes the valve body 13 having an open-ended fluid passage 14 with a beveled valve seat 16 formed in the open terminal end thereof and a reduced neck portion 13a closing the other end thereof, the reduced neck portion 13a being apertured as at 13b.

A flanged collar 17 externally threaded to effect threaded assembly with the threaded portion 11a of the boss 11 is assembled around a cylindrical portion formed on one end of the valve body 13 and retained by a snap ring 15 carried in an annular peripheral groove in the body and abutting the end of the collar. The other end of the collar 17 abuts against a flange 13c defined by the valve body 13.

The valve body 13 may also be provided with an annular grooved recess 13d to receive an O-ring seal 18 which establishes a sealing relationship between the collar 17 and the valve body 13.

A washer-type gasket 19 is interposed between the boss 11 and the collar 17 to effect a further seal of the coupling joint between the spigot structure 12 and the drum or closure 10.

A generally tubular handle or actuator 20 defining an open-ended bore 20a extends through the aperture 13b in the neck 13a and is slidably positioned therein for reciprocation along the axis of the fluid passageway 14 by a bushing 21.

A diaphragm seal comprising a sleeve-like diaphragm made of a flexible wear-resistant material has one end thereof interposed between the bushing 21 and the neck 13a of the valve body 13 and the other end snugly encircles a portion of the handle or actuator 20.

To promote efficient sealing, the ends of the diaphragm seal 22 may be beaded as at 22a and an appropriate peripheral grooved recess may be defined by the handle 20 to receive one of the beads. It will be evident upon making reference to the drawings that the aperture 13b of the neck 13a may be counterbored to present an abutment shoulder against which the other end of the diaphragm seal 22 may engage.

The seal effected by the diaphragm seal 22 between the fluid passageway 14 and the outside of the spigot structure 12 is particularly efficient because it is not necessary to overcome a break-away load upon moving the reciprocable handle or actuator 20 as has usually been necessary heretofore because of the radially-directed forces generally existing between a reciprocable shaft and a sealing structure constructed in accordance with conventional practice.

It will be noted that the handle or actuator 20 is provided with an integral knob 20b which may be conveniently grasped for manipulation of the handle or actuator 20 in reciprocating the same and a suitable boss may also be defined by the bushing 21 so that a resilient biasing means taking the form in this embodiment of a coil spring 23 may be interposed between the knob 20b and the valve body 13 to normally bias the handle or actuator 20 in one direction.

The other end of the handle or actuator 20 is characterized by the provision of a neck upon which a valve is mounted for seating on the valve seat 16 to selectively control the flow of fluid through the fluid passageway 14.

This invention is particularly characterized by the provision of positioning means carried by the handle or actuator 20 and cooperable with the valve body to position the valve away from the seat against the normal bias of the coil spring 23, but being yieldable under a suitable releasing force.

In the preferred embodiment shown, the positioning means is employed as an integral part of the valve itself, a disc or washer-like apertured support member 24 being provided to be mounted on the neck portion of the handle or actuator 20 whereupon an O-ring gasket 26 may be placed against the support element 24 to overlappingly abut the peripheral edges thereof, thereby forming a valve-seating area.

A generally circular retainer 27 having shaped edge portions formed complementary to the O-ring gasket holds the O-ring gasket 26 in abutting engagement with the support element 24.

A bushing 28 is fitted over the neck portion of the handle 20 to complete the valve assembly. Thus, the O-ring gasket 26, together with the support element 24 and the retainer 27, operate as the head of a valve and may be selectively seated in sealing relationship with the valve seat 16 upon actuation of the handle or actuator 20 which operates as a valve stem.

A flapper-type check valve 29 made of a sleeve of flexible material with the open end thereof fitted over the outside of the bushing 28 is retained thereon by a snap ring 30. The other end of the handle 20 is provided with an aperture 31 so that the hollow bore 20a of the handle 20 communicates freely with the atmosphere, the aperture 31 being positioned to lie outside of the valve body 13. Thus, if decantation of fluid occurs, air from the atmosphere may be vented inwardly into the drum or closure 10 through the aperture 31, the hollow bore 20a of the handle 20, and the check valve 29 (Figure 2).

A plurality of axially extending guide fingers 32 are bent away from the support element 24 and extend rearwardly therefrom for slidable cooperation with the bore walls of the fluid passageway 14. In the present embodiment, there are three fingers 32 integral with the support element 24, spaced 120° apart from one another, thereby providing an evenly distributed support to radially position the handle 20 and the valve attached thereto relative to the valve seat 16.

As may be seen on the drawing, the valve body 13 is provided with a counterbore or step indicated by the reference numeral 33 which lies directly adjacent the beveled valve seat 16. The counterbore or step 33 is adapted to receive in mating relationship therewith a bead 32a formed on each of the fingers 32 (Figure 3).

Because the fingers 32 and the support element 24 are preferably formed from an integral piece of metal, the fingers 32 will embody a certain amount of inherent resilience, thereby permitting the beads 32a to seat in the counterbore or step 33 with a snap-like action. After such mating relation is established between the beads 32a and the step 33, the valve and the handle 20 will be retained in an open position against the bias of the coil spring 23. In this manner, the valve assembly is firmly retained in a predetermined axial position. In order to close the valve to seal off the fluid passageway 14, the knob 20b of the handle 20 need only be actuated by a releasing force of sufficient quantitative value to overcome the locking action of the beads 32a and the counterbore or step 33.

To further facilitate the spring function of the fingers 32 in locking the valve assembly relative to the valve body 13 and also to permit the use of low cost, soft metal for making an integral valve fitting which includes the support element 24 and the fingers 32, it is desirable to employ a generally circular wire spring 34 which may be appropriately crimped as at 34a to conveniently seat in the grooved portion 32b on the opposite side of the bead 32a.

As will be seen on the drawing, the wire spring 34 is of an expanding nature and operates to load the guide fingers radially outwardly, the amount of load exerted thereby being, of course, sufficient to retain the valve movement against the bias of the coil spring 23, but being insufficient to restrain movement of the valve assembly when a releasing force is applied to the handle or actuator 20.

The fluid passageway 14 is preferably provided with an outlet in the form of a nozzle 36 which communicates with the fluid passageway 14 and which may be readily adapted for attachment to flexible conduits or other types of extension as are frequently employed in connection with decantation apparatus.

In operation, the coil spring 23 will normally bias the handle or actuator 20, and hence the elements of the valve, into closed position so that the O-ring gasket 26 will be seated on the valve seat 16 of the valve body 13.

To permit flow of fluid outwardly of the drum or closure 10 through the spigot structure 12, the knob 20b of the handle or actuator 20 is pushed against the bias of the coil spring 23 to move the valve off its seat, thereby permitting fluid to flow outwardly from the drum or closure 10 through the fluid passageway 14 and through the nozzle 36.

To yieldably lock the valve assembly in flow position, the handle or actuator 20 is reciprocated inwardly until the beads 32a on the fingers 32 meet with the counterbore or step 33 defined in the open terminal end of the valve body 13.

It will be noted that the diaphragm seal 22 effectively complements the actuation of the valve assembly since the reciprocation of the handle may be effected without necessitating the overcoming of a break-away load. It should also be noted that the fingers 32 and the support element 24 radially position the free end of the handle or actuator 20 during the course of movement thereof relative to the fluid passageway 14 in the valve body 13.

Although various minor modifications in structure might be suggested by those versed in the art, it should be clearly understood that I do not wish to be specifically limited to the precise structural details herein described by way of illustration only, but wish to embody within the scope of this patent all such modifications as reasonably and properly come within the scope of my contribution to the art.

I claim as my invention:

1. A spigot housing defining an open-ended bore to serve as a fluid passageway with a reduced neck portion closing the other end thereof, a valve seat portion defined by the spigot housing in the open end of the bore, an annular locking groove defined in the bore adjacent the valve seat portion, a generally cylindrical sealing sleeve made of flexible material and having an annular bead on each end thereof, a bushing in the reduced neck portion clamping one of said annular beads in seal-tight relationship to the spigot housing, a shaft extending through and slidably supported by the housing, said shaft defining an intermediate annular seating groove to receive the other of said annular beads of said sealing sleeve, a positioner carrier by said shaft near one end thereof in the locale of the open end of the bore, said positioner comprising a washer-like body with a plurality of radially spaced axially extending fingers to ride on the bore walls of the fluid passageway, an annular gasket partially abutting the body of the positioner and seatable on the valve seat portion of the spigot, a retainer carried by the shaft and holding the gasket in assembly with the positioner, a handle portion on the other end of the shaft and a spring operable between the handle portion on the other end of the shaft and the spigot housing to normally bias the valve assembly into closed position, said fingers defining interlocking mating means to cooperate with the annular locking groove defined by the spigot housing to retain the valve assembly in predetermined open flow position.

2. In a drum valve assembly, a valve body defining an open-ended fluid passageway, a beveled counterbore in the passageway forming a valve seat in the open end thereof, a stepped counterbore directly adjacent said valve seat in the fluid passageway comprising an annular seating groove, a stem-like actuator, a positioner carried by said actuator and defining a radially extending support body with a plurality of spaced-apart axially extending guide fingers slidably cooperable with the walls of the fluid passageway to radially align the actuator generally along the axis of the passageway, retainer means carried by the actuator, and O-ring gasket between the retainer means and the positioner, said O-ring gasket constructed to overlap the positioner and being seatable on the valve seat, said O-ring together with said retainer means, said positioner and said actuator forming a leak-proof valve to control the flow of fluid through the passageway, a bead-like protuberance formed on each of the axially extending guide fingers adapted to seat in said seating groove, biasing means between the valve body and the actuator normally effective to bias said valve into a closed position, and means between said actutaor and said valve body whereby said valve may be selectively reciprocated away from the valve seat against the bias of the biasing means, said bead-like protuberances being seatable in the seating groove to retain the valve in open flow position against the bias of said biasing means but being yieldable under a releasing force.

3. In a drum valve assembly, a valve body defining an open-ended fluid passageway and having a valve seat in one end thereof, a stem-like actuator extending through the other end of said passageway and supported by said body, a positioner on one end of said actuator and having a radially extending support body with a plurality of spaced-apart axially extending guide fingers slidably cooperable with the walls of the fluid passageway to radially align the actuator for reciprocatory movement generally along the axis of the passageway, an O-ring gasket carried by said positioner and having a portion extending radially outwardly of said support body to seat on said valve seat, said O-ring together with said positioner and said actuator forming a leak-proof valve to control of fluid through the passageway, said valve body having recess means in said passageway mating with said guide fingers to retain the valve in open position.

4. In a drum valve assembly, a valve body having a fluid passageway, a valve seat in the end of said passageway, a stem-like actuator, a positioner carried by said actuator and defining a radially extending support body with a plurality of spaced-apart axially extending guide fingers bent away from the outer peripheral portion thereof and being slidably cooperable with the walls of the fluid passageway to radially align the actuator generally along the axis of the passageway, an O-ring gasket carried by said positioner and having a portion extending radially outwardly of said positioner to seat on the valve seat, said O-ring together with said positioner and said actuator forming a leak-proof valve to control the flow of fluid through the passageway, means between said actuator and said valve body supporting said valve stem for selective reciprocation away from the valve seat, and mating detent means between said guide fingers and the walls of the passageway to retain the valve in a selected axial flow position.

5. In a drum valve assembly, a valve body defining a fluid passageway, a valve seat in one end of said passageway, a stem-like actuator defining a generally tubular bore open at one end, a positioner carried on one end of said actuator and defining a radially extending support body with a plurality of spaced-apart axially extending guide fingers slidably cooperable with the walls of the fluid passageway to radially align the actuator generally along the axis of the passageway, an O-ring gasket carried by said positioner and having at least a portion thereof extending radially outwardly of the positioner in seating relationship on the valve seat, said O-ring together with said positioner and said actuator forming a leak-proof valve to control the flow of fluid through the passageway, a check valve on the open end of the actuator, and means between said actuator and said valve body to support said actuator for reciprocation, whereby said valve may be selectively moved away from the valve seat, said actuator defining an aperture establishing communication between the hollow tubular bore thereof and the atmosphere to permit venting air to pass from the atmosphere through said hollow tubular bore through the check valve.

6. In a drum valve assembly, a valve body having a fluid passageway, a valve seat in the end of said passageway, a stem-like actuator, a positioner carried by said actuator and disposed transverse to said passageway with a plurality of integral guide fingers bent away from peripherally spaced portions thereof and being slidably cooperable with the walls of the fluid passageway to centrally align said actuator within said passageway, a resilient valve member projecting beyond the periphery of said positioner and arranged to seat on said valve seat, said resilient valve member together with said positioner and said actuator forming a leak-proof valve to control the flow of fluid through said passageway, means between said actuator and said valve body supporting said actuator for selective reciprocation of said valve member away from said valve seat, and mating detent means between said guide fingers and the wall of said passageway to retain the valve in a selected flow position.

JACOB RUSH SNYDER.

References Cited in the file of this patent

UNITED STATES PATENTS

| Number | Name | Date |
|---|---|---|
| 553,389 | Brower | Jan. 21, 1896 |
| 1,159,213 | Grimm | Nov. 2, 1915 |
| 1,861,442 | Hammerstein | June 7, 1932 |
| 1,888,130 | Huffman | Nov. 15, 1932 |
| 2,245,648 | Campbell | June 17, 1941 |
| 2,357,321 | Fuller | Sept. 5, 1944 |
| 2,409,532 | Bentley et al. | Oct. 15, 1946 |
| 2,465,628 | Border | Mar. 29, 1949 |
| 2,506,722 | Kuehn et al. | May 9, 1950 |

FOREIGN PATENTS

| Number | Country | Date |
|---|---|---|
| 102,598 | Switzerland | of 1923 |
| 533,731 | France | of 1921 |